US010275267B1

(12) United States Patent
de Kadt et al.

(10) Patent No.: US 10,275,267 B1
(45) Date of Patent: Apr. 30, 2019

(54) TRUST-BASED RESOURCE ALLOCATION

(71) Applicant: Amazon Technologies, Inc., Reno, NV (US)

(72) Inventors: Christopher Richard Jacques de Kadt, Cape Town (ZA); James Alfred Gordon Greenfield, Cape Town (ZA); Gustav Karl Mauer, Bellville (ZA)

(73) Assignee: Amazon Technologies, Inc., Reno, NV (US)

( * ) Notice: Subject to any disclaimer, the term of this patent is extended or adjusted under 35 U.S.C. 154(b) by 1502 days.

(21) Appl. No.: 13/657,714

(22) Filed: Oct. 22, 2012

(51) Int. Cl.
  *G06F 9/455* (2018.01)
  *G06F 21/60* (2013.01)
  *G06F 21/57* (2013.01)
  *H04L 12/24* (2006.01)

(52) U.S. Cl.
  CPC ...... *G06F 9/45533* (2013.01); *G06F 9/45537* (2013.01); *H04L 41/0803* (2013.01); *G06F 21/57* (2013.01); *G06F 21/60* (2013.01)

(58) Field of Classification Search
  USPC ................................................ 709/223, 226
  See application file for complete search history.

(56) References Cited

U.S. PATENT DOCUMENTS

| 8,417,938 | B1* | 4/2013 | Considine et al. | 713/151 |
| 2009/0089860 | A1* | 4/2009 | Forrester et al. | 726/3 |
| 2011/0179477 | A1* | 7/2011 | Starnes et al. | 726/9 |
| 2011/0302415 | A1* | 12/2011 | Ahmad et al. | 713/168 |

* cited by examiner

*Primary Examiner* — Joseph E Avellino
*Assistant Examiner* — Marshall M McLeod
(74) *Attorney, Agent, or Firm* — Kilpatrick Townsend & Stockton LLP

(57) ABSTRACT

Methods and systems for provisioning computing resource instances among implementation resources based on trust to reduce interference between computing resource instances implemented by the same implementation resources. In an embodiment, a trust rating is determined for a computing resource instance based at least in part on one or more trust factors. The suitability of an implementation resource to implement the given computing resource instance may be evaluated based at least in part on the trust rating of the computing resource instance and a trust rating of the implementation resource. In some embodiments, the trust rating of the implementation resource may be predefined or based on trust ratings of computing resource instances that are currently implemented by the implementation resource. An implementation resource may be selected to implement the computing resource instance based at least in part on its suitability thus determined.

26 Claims, 12 Drawing Sheets

TRUST-BASED RESOURCE ALLOCATION

BACKGROUND

A single implementation resource may be used to implement or host one or more computing resources. For example, a single host may implement multiple virtual machines. A rack-mount may hold multiple hosts, multiple storage devices, and/or multiple other devices. A power source may provide power to multiple racks. As such, resources such as CPU, disk, network bandwidth, cache and the like may be shared among multiple instances of computing resources. Such sharing of resources may lead to interference and/or competition for resources among the instances. For example, an instance may exhibit abusive behavior towards shared resources (e.g., taking up disproportionate amount of CPU time) leading to performance degradation of other instances. Such behavior can be intentional, unintentional or both. As another example, an instance may be subject to a security attacks (e.g., denial of service (DoS) or other types of attacks) that adversely impact other instances of same host.

BRIEF DESCRIPTION OF THE DRAWINGS

Various embodiments in accordance with the present disclosure will be described with reference to the drawings, in which.

DETAILED DESCRIPTION

Figure 1:
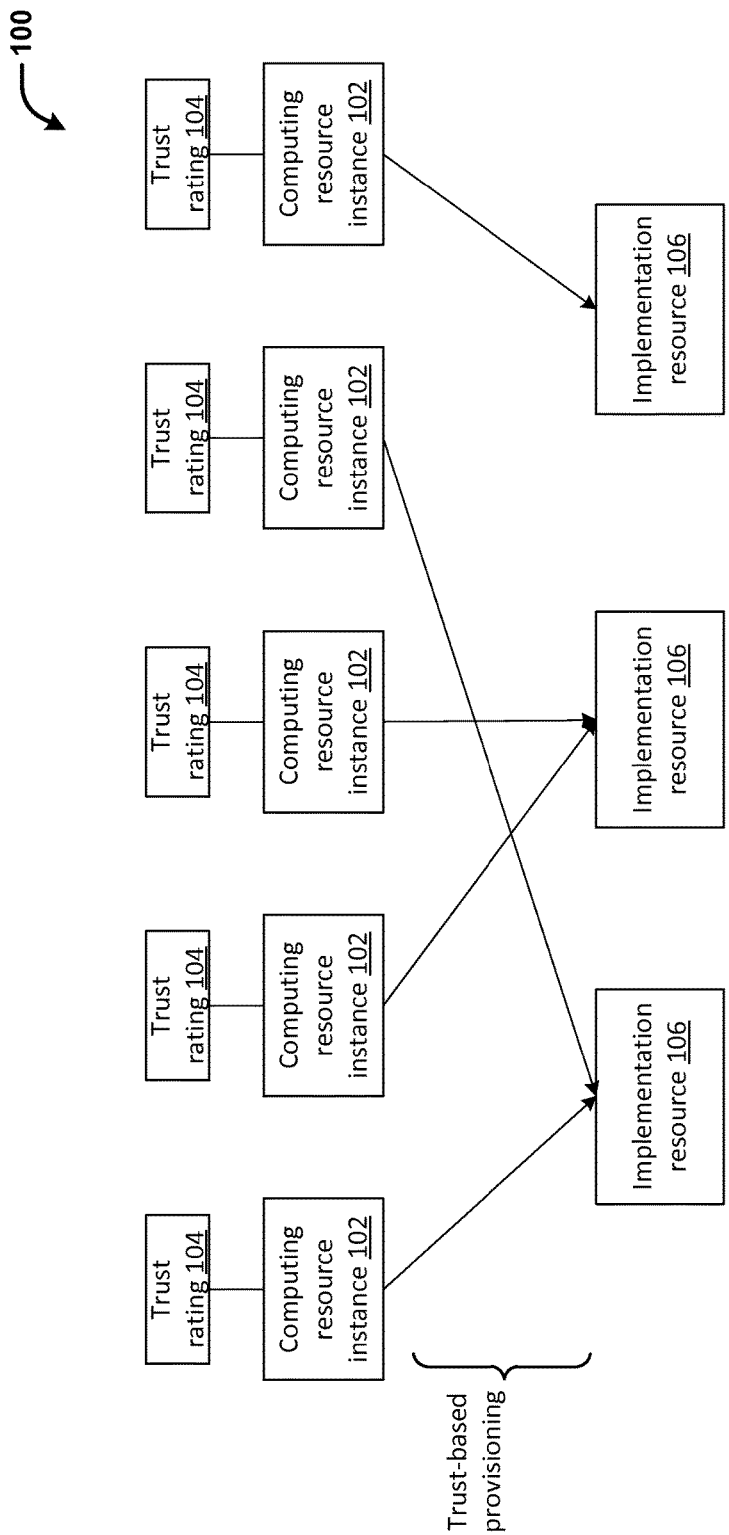
FIG. 1 illustrates trust-based provisioning of computing resources, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods and systems for provisioning instances of computing resources based on trust so as to mitigate the risk of adverse interference between instances implemented by the same implementation resources. In some embodiments, a computing resource service provider may enable a customer and/or an administrator to provision, de-provision, configure and/or reconfigure suitable aspects of computing resources and services. For example, a customer of virtual computer system services may provision one or more virtual computer system instances. The user may then configure the provisioned virtual computer system instances to execute the user's application programs. A computing resource service provider may provision each of a variety of types of computing resource (e.g., virtual computer systems, virtual data stores, virtual network connections) with a particular set of implementation resources (e.g., data center space, physical server computers, networking hardware). At least some of the implementation resources may be capable of participating in the implementation of multiple computing resource instances, each potentially associated with a different customer of the computing resource service provider.

In at least one embodiment, implementation resources are apportionable among a plurality of resource allocation units or logical "slots." Computing resources, for instance, may correspond to a number of resource allocation units of an implementation resource. A hardware server (physical host), for example, may be able to maintain a number of standard virtual computer systems offered by a computing resource service provider. Each standard virtual computer system may correspond to a resource allocation unit of the server. Some computing resources may correspond to a number of resource allocation units greater than one, such as multiple resource allocation units. For example, a virtual computer system having, in one or more respects, increased performance over a standard virtual computer system, may correspond to multiple resource allocation units due to the increased hardware capacity necessary for operating the virtual computer system with higher performance.

In some embodiments, the provisioning of a computing resource instance includes selecting a suitable implementation resource. In some embodiments, the selection of the suitable implementation resource may be based at least in part on the type of the instance (e.g., memory, CPU, storage, pricing, etc.), geographical location and availability of the implementation resource and the like. Some of the selection criteria may be specified or otherwise configurable by a customer.

To reduce the adverse interference between computing resources instances implemented by the same implementation resources, a resource instance to be provisioned may be assigned a trust rating and implemented by an implementation resource that contains instances with similar trust ratings as the resource instance. As used herein, a trust rating may include an indication of the likelihood that the instance would exhibit responsible and non-abusive behavior toward shared resources, the likelihood that the instance would cause network or security breaches, etc. In some embodiments, the trust rating may be represented by a number, where a higher value may indicate, for example, a higher overall level of trustworthiness. In some embodiments, the trust rating may be represented by a vector or collection of metrics, each may be associated with a quantification for a particular aspect of concern, such as network security, software reliability and the like.

In various embodiments, a trust rating may be assigned to a customer and/or instances associated with the customer based on a variety of trust factors. Such factors may change over time and any subset of the factors may be used to determine the trust rating of a customer and/or a computing resource instance. An example of such factors may include the level of security associated with a customer's computing infrastructure. A customer's computing infrastructure may include networks, operating systems, servers, applications and other computing resources that are owned by the customer. Such infrastructure may be managed at least in part by the customer, a remote program execution service or other entities. For example, the security of a customer's infrastructure may include security of a customer's internal network, the security of virtual machine instances provisioned by a customer and the like. In some cases, the trust rating associated with a customer's infrastructure may be inferred from information maintained by the service provider. For example, a service provider may maintain configuration files, templates, and/or virtual machine images of computing resources provisioned by the customer. Based on such information, a service may determine whether a given instance of computing resource may be trustworthy. For example, a virtual machine instance may be assigned a low trust rating if the virtual machine image for the instance includes a version of an operating system with known security vulnerabilities. For another example, the customer may request the service provider to perform audits of the customer's infrastructures and the results of such audits may be used to determine the security and reliability of a customer's infrastructures, for example.

In an embodiment, a customer may provide infrastructure related information (e.g., security reports, audit reports) to a service provider. In another embodiment, other external sources such as a third party service provider, audit agency, industry standard group, government agency and the like. Such information may include, for example, whether a customer's infrastructure complies with a security or audit standard such as Payment Card Industry Data Security Standard (PCI DSS), Statement on Auditing Standards No. 70 (SAS70) and the like, and/or laws and regulations such as data security laws. Compliance with standards and regulations may be evidenced by certificates issued by an industry standard group, a government agency, or any other entities, or audits performed by a customer, a service provider or a third entity. Generally, a customer who complies with one or more such standards or regulations is considered to have taken certain measures to ensure the security of its infrastructure and/or applications such that computing resource instances provisioned to the customer may be less susceptible to security breaches or service attacks and/or less likely to abuse shared resources. In other words, a customer that is determined to comply with certain standards and/or regulations may be associated with a higher trust rating.

In some embodiments, factors used to determine the trust rating of a customer and/or an instance may include a customer's track records such as past resource usage patterns, past network security or data breaches, severity, frequency and/or recency of such information and the like. In some embodiments, customer track records may include information, such as contained in log files, that is related to one or more computing resource services that have been provisioned by the customer. In various embodiments, such records may be maintained by the service provider or derived from information provided by a customer or a third party such as an auditing agency. Likewise, the trust rating of a customer may be inferred from the identity of a customer. For example, government entities, large corporation or organizations may have a higher trust rating than a smaller entity.

In some embodiments, factors used to evaluate the trust rating of a customer and/or a computing resource instance may include information inferred from course of dealings between a customer and a service provider. Such course of dealings may include a customer's payment history, methods of payment, the amount and types of transactions between the customer and the service provider, an agreement between the customer and the service provider (e.g., service level agreement or non-disclosure agreement) and the like. For example, a customer that has been making payments reliably for the past three years may be assigned a higher trust rating than a customer has been consistently delinquent in payment. For another example, a customer that makes payments with a credit card may be assigned a lower trust rating than a customer that makes payments using invoices. In some cases, a customer that has made substantial investments with a service provider or that has an established relationship with the service provider, for example, as evidenced by the amount and types of services purchased by the customer or an agreement between the customer and the service provider, may be assigned a higher trust rating than a customer that has made relatively little investment or has had little dealings with the service provider.

In some embodiments, once a trust rating is assigned to a customer or a computing resource instance based on some or all of the trust factors discussed above, a suitable implementation resource may be selected to host the instance. In general, instances with similar trust ratings may be placed on the same implementation resources and instances with different trust ratings may be place on different implementation resources to reduce adverse interference between the instances. In an embodiment, the suitability of one or more available implementation resource to host a given instance may be evaluated based at least in part on a collection of one or more heuristics. Some heuristics may be hard-coded rules of instance placement, for example, based on location, availability, and other software and/or hardware characteristics of an implementation resource. For example, a heuristic may specify that an implementation resource must be configured to implement a given instance type (e.g., with the required CPU, memory, storage, network I/O), located in a region and/or availability zone or otherwise comply with one or more customer-specified criteria. Some heuristics may be used to exclude implementation resources or render them unsuitable to implement the given computing resource instance. For example, a heuristic may specify that "instances belonging to customer X may not be co-located with instances belonging to customer Y" or "instances containing operating systems below version 2.0 may not be co-located with instances containing operating system above version 4.0."

Other heuristics may not be hard-coded rules but instead results obtained by utilizing various optimization algorithms. For example, one such heuristics may specify that an implementation resource that currently hosts instances with trust ratings that are similar to the instance to be hosted is more suitable than implementation resources that host instances with trust ratings that are very different from that of the instance. In some embodiments, a trust rating for an implementation resource may be calculated based at least in part on the trust ratings of some or all of the instances currently implemented by the implementation resources. In such embodiments, the suitability of the implementation resource may be determined based on the proximity of the trust rating of the implementation resource and the trust rating of the instance to be provisioned. In other embodiments, the trust rating for an implementation resource may be predetermined or determined based on predefined characteristic(s).

In some embodiments, eligible implementation resources may be ranked according to their suitability to host a given instance. For example, each implementation resource may be assigned a suitability ranking that may be a number, where a higher number indicates that the implementation resource is more suited to host the given instance. In some embodiments, the suitability ranking for a given implementation resource may be calculated from a subset of the collection of heuristics. For example, each of the subset of heuristics may produce a heuristic value for the given implementation resource and the overall suitability ranking may be calculated as a combination (e.g., linear combination) of the heuristic values. In some embodiments, the heuristic may be given different weights according to their relative importance and/or priority.

In some embodiments, an implementation resource may be selected based on the suitability ranking of the implementation resources. For example, the top ranking implementation resource may be selected or an implementation resource may be selected at random from the N top-ranked implementation resources where N is a predetermined number. In various embodiments, the suitability ranking for implementation resources may not necessarily be the same for different computing instances to be placed. For example, an implementation resource that contains instances with low-trust ratings may rank relatively low (i.e. less suitable) for an instance with a high trust rating but may rank relatively high (i.e., more suitable) for an instance with a low trust rating.

In some embodiments, results of the selection of implementation resources may be influenced and/or overridden by a whitelist and/or blacklist of customers or customer instance that indicate high-trust ratings or low-trust ratings, respectively. Such a whitelist and/or blacklist may be generated based, for example, on statistical analysis of customer data, security data, and the like. In some embodiments, the content of such a whitelist or blacklist may evolve over time. For example, in an embodiment, a customer that is initially on a blacklist and may move to a whitelist after five years of established relationship with a service provider.

In some embodiments, instances of computing resources may migrate from one implementation resource to another as the trust ratings for with the instances and/or the implementation resource change dynamically. In an embodiment, such migration may occur dynamically while the instance is running In another embodiment, such migration may occur another time, for example, upon reboot of the instance.

FIG. 1 illustrates trust-based provisioning 100 of computing resources, in accordance with at least one embodiment. In this example, one or more computing resource instances 102 such as virtual machine instances are provisioned among one or more implementation resources 106 such as server hosts. In an illustrative embodiment, the trust-based provisioning may be based at least in part on a trust rating 104 that is determined for each of the computing resource instances 102 using methods described above and in more details below. For example, in an embodiment, computing resource instances 102 with similar trust ratings are more likely to be hosted by the same implementation resources 106.

Figure 2:
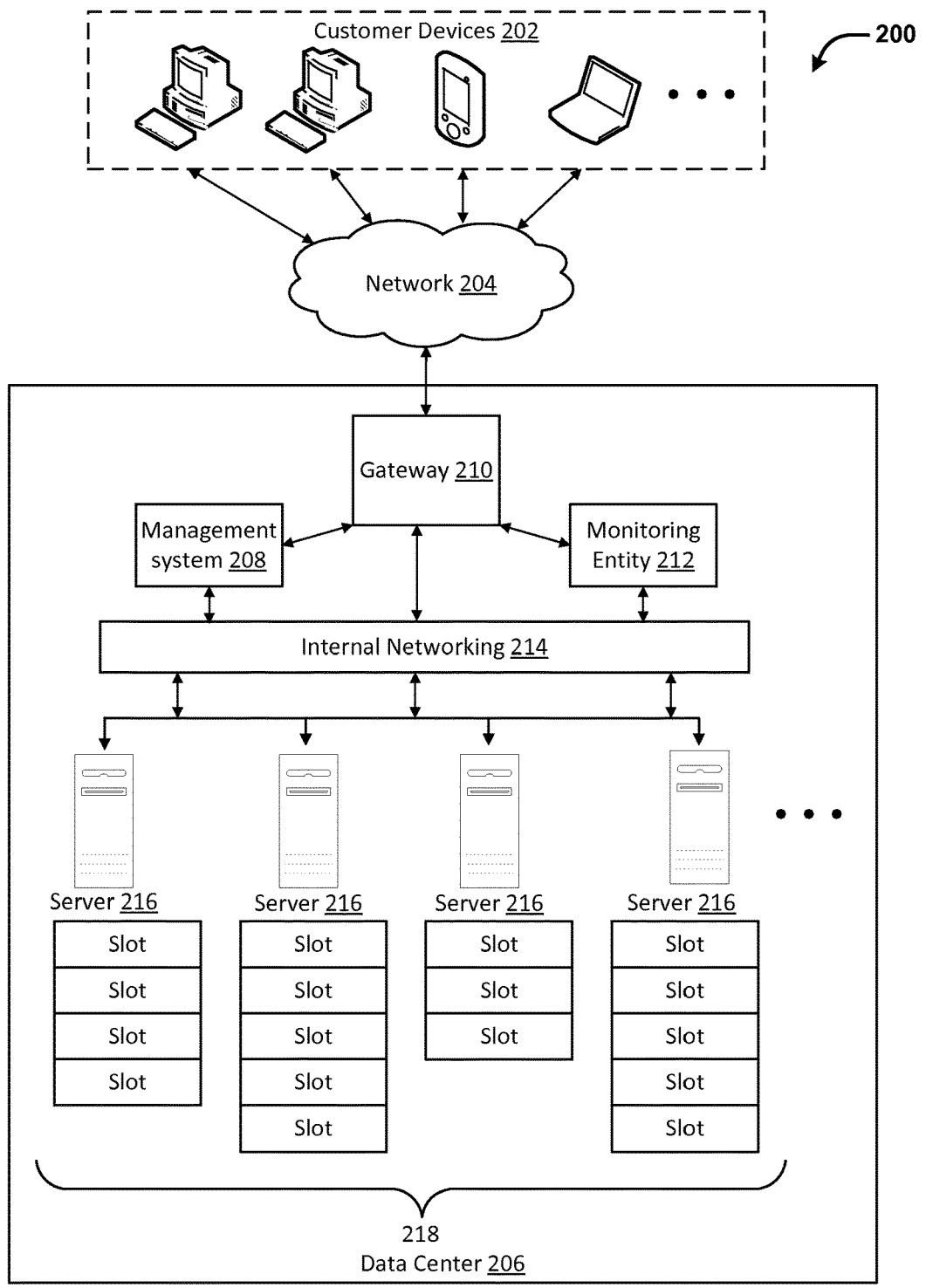
FIG. 2 illustrates an example distributed computing and/or datacenter environment in which various embodiments may be implemented.

In at least one embodiment, one or more aspects of the trust-based provisioning illustrated in FIG. 1 may incorporate and/or be incorporated into a distributed computing environment. For example, FIG. 2 illustrates an example distributed computing and/or datacenter environment 200 in which various embodiments may be implemented. In this example, one or more customer devices 202 connect via network 204 to datacenter 206. The customer devices 202 may include any devices capable of connecting via a public network to the data center, such as personal computers, smartphones, tablet computing devices, and the like. In an exemplary embodiment, network 204 may include any publicly accessible networks (such as the Internet, mobile and/or wireless networks), private network or any other networks. The datacenter 206 includes one or more management components, including but not limited to a management system 208, a gateway 210 and/or a monitoring entity 212, which are collectively connected via internal networking 214 to a plurality of internal servers 216. The gateway 210 may filter and route traffic in and out of the datacenter, such as to and/or from the servers via the internal networking. The management system 208, often referred to as "control plane" or "control plane system," may receive requests to manipulate computing resources of the datacenter, such as provisioning resources, altering routing and the like. The monitoring entity 212 may receive and report information about the status of computing resources in the data center, such as information about the internal servers. The management system 208 and the monitoring entity 212 may connect to the network 204 via gateway 210 or their own gateways. In various embodiments, components of a data center 206 such as servers 216 may be located locally or distributed across one or more regions, isolation or availability zones and the like.

Each internal server 216 may provide multiple logical machine slots 218, each slot capable of running a computing resource instance, such as a virtual machine instance. Any number of the plurality of the customer devices previously described may provision to run any number of computing resource instances in any number of slots, up to the limits of the datacenter (whether physical, logical or externally imposed), and the slots may be allocated to the connecting customer devices based on factors described herein including trust ratings associated with the customers or computing resource instances, trust ratings of instances currently implemented by the servers 216, operational and/or business-related criteria, such as geographical proximity, level of support and/or resources allocated to the user, server and/or slot health and/or readiness and the like.

Figure 3:
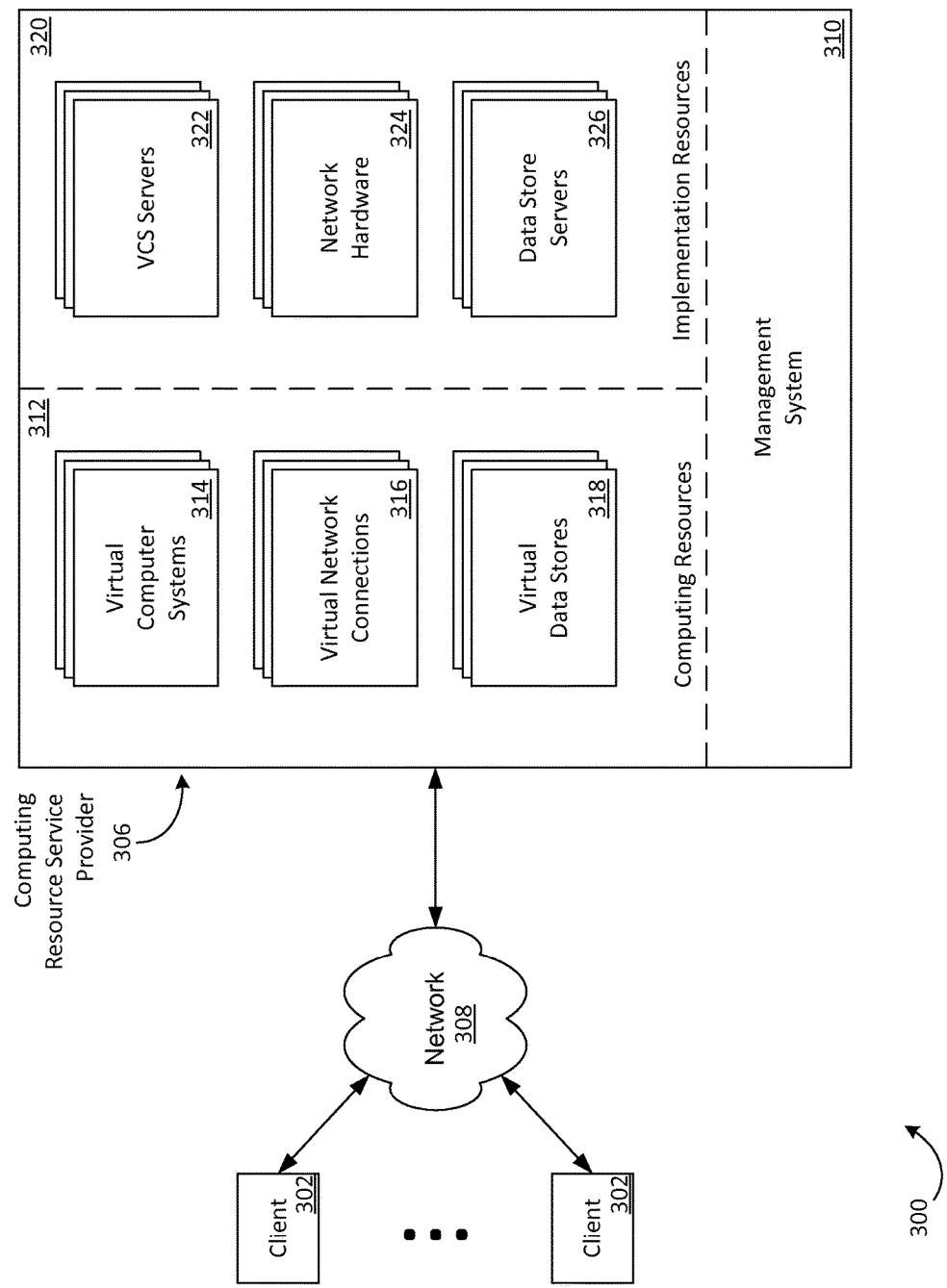
FIG. 3 illustrates an example computing resource provisioning environment, in accordance with at least one embodiment.

In at least one embodiment, one or more aspects of the trust-based provisioning illustrated in FIG. 1 may incorporate and/or be incorporated into a computing resource provisioning architecture. FIG. 3 illustrates an example virtual resource provisioning environment 300, in accordance with at least one embodiment. The example computing resource provisioning environment 200 includes multiple clients 302 communicatively connected to a computing resource service provider 306 over a network 308. For example, the clients 302 include computing devices such as customer devices 202 of FIG. 2 and/or client programs incorporated into such computing devices.

One or more of the clients 302 may be utilized by one or more customers of the computing resource service provider 306 to interact with a management system 310 of the computing resource service provider 306, and thereby provision one or more computing resources 312. For example, the management system 310 may correspond to management system 208 of FIG. 2. Alternatively, or in addition, one or more of the clients 302 may be utilized (not necessarily by computing resource service provider 306 customers) to interact with provisioned computing resources 312. The provisioned computing resources 312 may include any suitable computing resources. Examples of suitable computing resources 312 include virtual computer systems 314, virtual network connections 316, and virtual data stores 318, as well as computing resources not shown in FIG. 3 such as specialized data processing agents, media streaming agents including audio and video streaming agents, message queues, publish-subscribe topics configured to notify subscribers having subscriptions that match events published to the publish-subscribe topics, monitoring agents, load balancing agents, and suitable combinations thereof.

The computing resource service provider 306 may include any suitable implementation resources 320. Each of the computing resources 312 may be implemented by a set of the implementation resources 320. In at least one embodiment, various implementation resources of the implementation resources 320 may be configured to participate in implementing, at least in part, multiple computing resources of the computing resources 312. Examples of suitable implementation resources 320 include virtual computer system servers 322, network hardware 324, and data store servers 326, as well as implementation resources not shown in FIG. 3. For example, some of the implementation resources 320 may include data centers 206 and servers 216 of FIG. 2. The management system 310 may process computing resource provisioning requests, manage allocation of computing resources 312 to implementation resources 320 and/or manage allocation of implementation resources 320 to computing resources 312, as well as provide for associated cost accounting services.

In an embodiment, customers may specify or the computing resource service provider may infer the system requirement (e.g., CPU, memory, storage) for the implementation resources to be provisioned. Further, a customer may specify the region and/or isolation or availability zone for the implementation resource. In some embodiments, a customer may also specify, explicitly or implicitly, whether one or more implementation resources should be reserved for or dedicated to implement computing resources that belong to the particular customer. In various embodiments, implementation resource dedication boundaries may correspond to boundaries between physical and/or hardware components including boundaries due to physical barriers and/or physical separations, as well as to hard (e.g., hardware enforced) scheduling and/or timing boundaries, and suitable combinations thereof.

Figure 4:
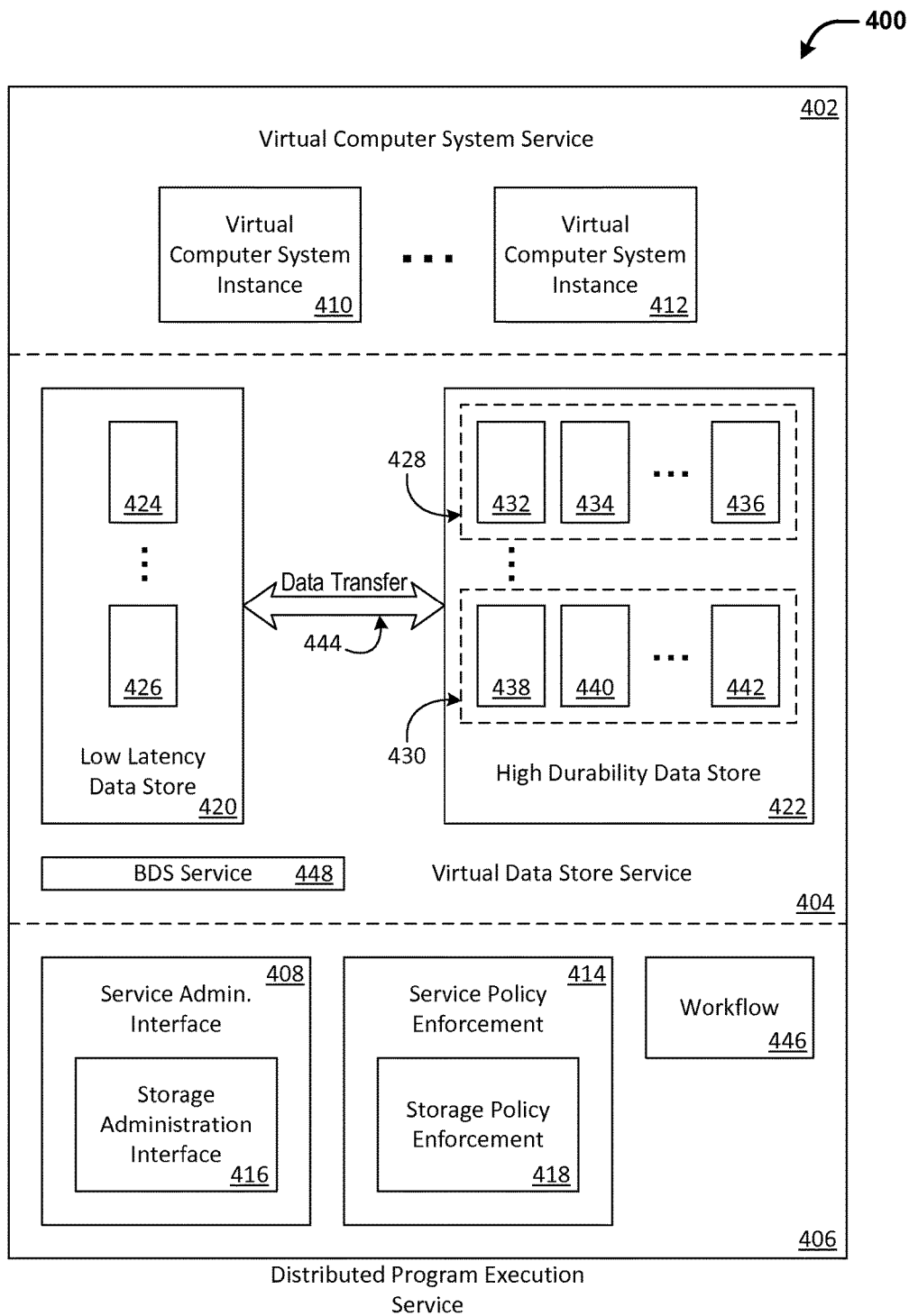
FIG. 4 illustrates aspects of an example distributed program execution service, in accordance with at least one embodiment.

In at least one embodiment, one or more aspects of the environments 200 and 300 may incorporate and/or be incorporated into a distributed program execution service. FIG. 4 illustrates aspects of an example distributed program execution service 400, in accordance with at least one embodiment. The distributed program execution service 400 provides computing resource services, including a virtual computer system service 402 and a virtual data store service 404, with a wide variety of implementation resources, such as servers and data centers, interlinked by a relatively high speed data network.

The distributed program execution service 400 may utilize the implementation resources to implement the computing resource services at least in part by executing one or more programs, program modules, program components and/or programmatic objects (collectively, "program components") including and/or compiled from instructions and/or code specified with any suitable machine and/or programming language. For example, the implementation resources may be allocated, and reallocated as necessary, to facilitate execution of the program components, and/or the program components may be assigned, and reassigned as necessary, to the implementation resources. Such assignment may include physical relocation of program components, for example, to enhance execution efficiency. From a perspective of a user of the virtualized computing services, the distributed program execution service 400 may supply implementation resources elastically and/or on-demand, for example, associated with a per resource unit commodity-style pricing plan.

The distributed program execution service 400 may further utilize the implementation resources to implement a service management system 406 configured at least to control the virtualized computing services. The service management system 406 may include a service administration interface 408. The service administration interface 408 may include a Web-based user interface configured at least to enable users and/or administrators of the virtualized computing services to provision, de-provision, configure and/or reconfigure suitable aspects of the virtualized computing services. For example, a user of the virtual computer system service 402 may provision one or more virtual computer system instances 410, 412. The user may then configure the provisioned virtual computer system instances 410, 412 to execute the user's application programs. The ellipsis between the virtual computer system instances 410 and 412 indicates that the virtual computer system service 402 may support any suitable number (e.g., thousands, millions, and more) of virtual computer system instances although, for clarity, only two are shown.

The service administration interface 408 may further enable users and/or administrators to specify and/or re-specify virtualized computing service policies. Such policies may be maintained and enforced by a service policy enforcement component 414 of the service management system 406. For example, a storage administration interface 416 portion of the service administration interface 408 may be utilized by users and/or administrators of the virtual data store service 404 to specify virtual data store service policies to be maintained and enforced by a storage policy enforcement component 418 of the service policy enforcement component 414. Various aspects and/or facilities of the virtual computer system service 402 and the virtual data store service 404 including the virtual computer system instances 410, 412, the low latency data store 420, the high durability data store 422, and/or the underlying implementation resources may be controlled with interfaces such as application programming interfaces (APIs) and/or Web-based service interfaces. In at least one embodiment, the management system 406 further includes a workflow component 446 configured at least to interact with and/or guide interaction with the interfaces of the various aspects and/or facilities of the virtual computer system service 402 and the virtual data store service 404 in accordance with one or more workflows.

In at least one embodiment, service administration interface 208 and/or the service policy enforcement component 414 may create, and/or cause the workflow component 446 to create, one or more workflows that are then maintained by the workflow component 446. Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the service administration interface 408. As another example, a policy enforcement workflow may be created from a policy enforcement workflow template configured with parameters by the service policy enforcement component 414.

The workflow component 446 may modify, further specify and/or further configure established workflows. For example, the workflow component 446 may select particular implementation resources of the distributed program execution service 400 to execute and/or be assigned to particular tasks. Such selection may be based at least in part on the implementation resource needs of the particular task as assessed by the workflow component 446. As another example, the workflow component 446 may add additional and/or duplicate tasks to an established workflow and/or reconfigure information flow between tasks in the established workflow. Such modification of established workflows may be based at least in part on an execution efficiency analysis by the workflow component 246. For example, some tasks may be efficiently performed in parallel, while other tasks depend on the successful completion of previous tasks.

The virtual data store service 404 may include multiple types of virtual data store such as a low latency data store 420 and a high durability data store 422. For example, the low latency data store 420 may maintain one or more data sets 424, 426 which may be read and/or written (collectively, "accessed") by the virtual computer system instances 410, 412 with relatively low latency. The ellipsis between the data sets 424 and 426 indicates that the low latency data store 420 may support any suitable number (e.g., thousands, millions, and more) of data sets although, for clarity, only two are shown. For each data set 424, 426 maintained by the low latency data store 420, the high durability data store 422 may maintain a set of captures 428, 430. Each set of captures 428, 430 may maintain any suitable number of captures 432, 434, 436 and 438, 440, 442 of its associated data set 424, 426, respectively, as indicated by the ellipses. Each capture 432, 434, 436 and 438, 440, 442 may provide a representation of the respective data set 424 and 426 at particular moment in time. Such captures 432, 434, 436 and 438, 440, 442 may be utilized for later inspection including restoration of the respective data set 424 and 426 to its state at the captured moment in time. Although each component of the distributed program execution service 400 may communicate utilizing the underlying network, data transfer 444 between the low latency data store 420 and the high durability data store 422 is highlighted in FIG. 4 because the contribution to utilization load on the underlying network by such data transfer 444 can be significant.

For example, the data sets 424, 426 of the low latency data store 420 may be virtual disk files (i.e., file(s) that can contain sequences of bytes that represents disk partitions and file systems) or other logical volumes. The low latency data store 420 may include a low overhead virtualization layer providing access to underlying data storage hardware. For example, the virtualization layer of the low latency data store 420 may be low overhead relative to an equivalent layer of the high durability data store 422. Systems and methods for establishing and maintaining low latency data stores and high durability data stores in accordance with at least one embodiment are known to those of skill in the art, so only some of their features are highlighted herein. In at least one embodiment, the sets of underlying implementation resources allocated to the low latency data store 420 and the high durability data store 422, respectively, are substantially disjoint. In a specific embodiment, the low latency data store 420 could be a Storage Area Network target or the like. In this exemplary embodiment, the physical computer system that hosts the virtual computer system instance 410, 412 can send read/write requests to the SAN target.

The low latency data store 420 and/or the high durability data store 422 may be considered non-local and/or independent with respect to the virtual computer system instances 410, 412. For example, physical servers implementing the virtual computer system service 202 may include local storage facilities such as hard drives. Such local storage facilities may be relatively low latency but limited in other ways, for example, with respect to reliability, durability, size, throughput and/or availability. Furthermore, data in local storage allocated to particular virtual computer system instances 410, 412 may have a validity lifetime corresponding to the virtual computer system instance 410, 412, so that if the virtual computer system instance 410, 412 fails or is de-provisioned, the local data is lost and/or becomes invalid. In at least one embodiment, data sets 424, 426 in non-local storage may be efficiently shared by multiple virtual computer system instances 410, 412. For example, the data sets 424, 426 may be mounted by the virtual computer system instances 410, 412 as virtual storage volumes.

Data stores in the virtual data store service 404, including the low latency data store 420 and/or the high durability data store 422, may be facilitated by and/or implemented with a block data storage (BDS) service 448, at least in part. The BDS service 448 may facilitate the creation, reading, updating and/or deletion of one or more block data storage volumes, such as virtual storage volumes, with a set of allocated implementation resources including multiple block data storage servers. A block data storage volume, and/or the data blocks thereof, may be distributed and/or replicated across multiple block data storage servers to enhance volume reliability, latency, durability and/or availability. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a block data volume stored on a server block data storage system in a data center may execute on one or more other physical computing systems at that data center.

The BDS service 448 may facilitate and/or implement local caching of data blocks as they are transferred through the underlying implementation resources of the distributed program execution service 200 including local caching at data store servers implementing the low latency data store 420 and/or the high durability data store 422, and local caching at virtual computer system servers implementing the virtual computer system service 202. In at least one embodiment, the high durability data store 422 is an archive quality data store implemented independent of the BDS service 448. The high durability data store 422 may work with sets of data that are large relative to the data blocks manipulated by the BDS service 448. The high durability data store 422 may be implemented independent of the BDS service 448. For example, with distinct interfaces, protocols and/or storage formats.

Each data set 424, 426 may have a distinct pattern of change over time. For example, the data set 424 may have a higher rate of change than the data set 426. However, in at least one embodiment, bulk average rates of change insufficiently characterize data set change. For example, the rate of change of the data set 424, 426 may itself have a pattern that varies with respect to time of day, day of week, seasonally including expected bursts correlated with holidays and/or special events, and annually. Different portions of the data set 424, 266 may be associated with different rates of change, and each rate of change "signal" may itself be composed of independent signal sources, for example, detectable with Fourier analysis techniques. Any suitable statistical analysis techniques may be utilized to model data set change patterns including Markov modeling and Bayesian modeling.

As described above, an initial capture 432 of the data set 424 may involve a substantially full copy of the data set 424 and transfer 444 through the network to the high durability data store 422 (may be a "full capture"). In a specific example, this may include taking a snapshot of the blocks that make up a virtual storage volume. Data transferred between the low latency data store 420 and high durability data store 422 may be orchestrated by one or more processes of the BDS service 448. As another example, a virtual disk (storage volume) may be transferred to a physical computer hosting a virtual computer system instance 210. A hypervisor may generate a write log that describes the data and location where the virtual computer system instance 210 writes the data. The write log may then be stored by the high durability data store 422 along with an image of the virtual disk when it was sent to the physical computer.

The data set 424 may be associated with various kinds of metadata. Some, none or all of such metadata may be included in a capture 432, 434, 436 of the data set 424 depending on the type of the data set 424. For example, the low latency data store 420 may specify metadata to be included in a capture depending on its cost of reconstruction in a failure recovery scenario. Captures 434, 436 beyond the initial capture 432 may be "incremental", for example, involving a copy of changes to the data set 424 since one or more previous captures. Changes to a data set may also be recorded by a group of differencing virtual disks which each comprise a set of data blocks. Each differencing virtual disk may be a parent and/or child differencing disk. A child differencing disk may contain data blocks that are changed relative to a parent differencing disk. Captures 432, 434, 436 may be arranged in a hierarchy of classes, so that a particular capture may be incremental with respect to a sub-hierarchy of capture classes (e.g., a capture scheduled weekly may be redundant with respect to daily captures of the past week, but incremental with respect to the previous weekly capture). Depending on the frequency of subsequent captures 434, 436, utilization load on the underlying implementation resources can be significantly less for incremental captures compared to full captures.

For example, a capture 432, 434, 436 of the data set 424 may include read access of a set of servers and/or storage devices implementing the low latency data store 420, as well as write access to update metadata, for example, to update a data structure tracking "dirty" data blocks of the data set 424. For the purposes of this description, data blocks of the data set 424 are dirty (with respect to a particular class and/or type of capture) if they have been changed since the most recent capture (of the same class and/or type). Prior to being transferred 444 from the low latency data store 420 to the high durability data store 422, capture 432, 434, 436 data may be compressed and/or encrypted by the set of servers. At the high durability data store 422, received capture 432, 434, 436 data may again be written to an underlying set of servers and/or storage devices. Thus each capture 432, 434, 436 involves a load on finite underlying implementation resources including server load and network load. It should be noted that, while illustrative embodiments of the present disclosure discuss storage of captures in the high durability data store 422, captures may be stored in numerous ways. Captures may be stored in any data store capable of storing captures including, but not limited to, low-latency data stores and the same data stores that store the data being captured.

Captures 432, 434, 436 of the data set 424 may be manually requested, for example, utilizing the storage administration interface 216. In at least one embodiment, the captures 432, 434, 436 may be automatically scheduled in accordance with a data set capture policy. Data set capture policies in accordance with at least one embodiment may be specified with the storage administration interface 416, as well as associated with one or more particular data sets 424, 426. The data set capture policy may specify a fixed or flexible schedule for data set capture. Fixed data set capture schedules may specify captures at particular times of day, days of the week, months of the year, and/or any suitable time and date. Fixed data set capture schedules may include recurring captures (e.g., every weekday at midnight, every Friday at 2 am, 4 am every first of the month) as well as one-off captures.

Figure 5:
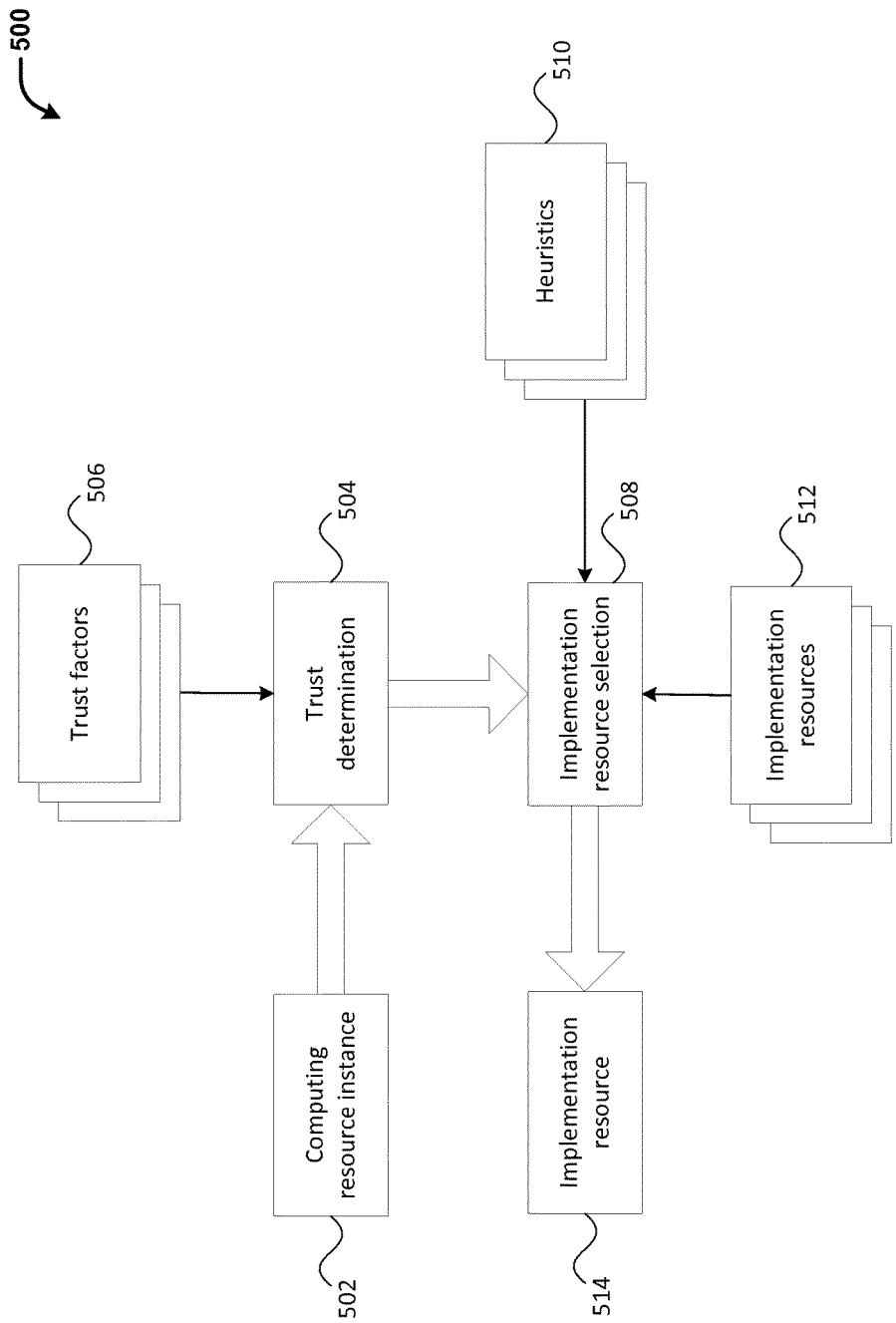
FIG. 5 depicts an example implementation of trust-based resource allocation, in accordance with at least one embodiment.

FIG. 5 depicts an example implementation 500 of trust-based resource allocation, in accordance with at least one embodiment. In this example, an implementation resource 514 is selected from a plurality of implementation resources 512 to implement a given computing resource instance 502. Some or all functionalities described herein may be implemented by one or more components (e.g., processes, servers, systems) in the management systems as discussed in connection with FIGS. 2-4.

In the illustrated embodiment and as will be discussed in further detail in connection with FIG. 6, a trust rating is determined 504 for the computing resource instance 502 based at least in part on one or more trust factors 506. Based at least in part on the trust rating for the computing resource instance 502, implementation resource selection 508 may be performed on one or more available implementation resources 512. In an embodiment, the implementation resources 512 may be ranked according to their suitability to implement the computing resource instance 502. The suitability may be determined at least in part on the trust rating for the computing resource instance 502 and/or one or more heuristics 510 that will be described in further detail in connection with FIG. 6.

Figure 6:
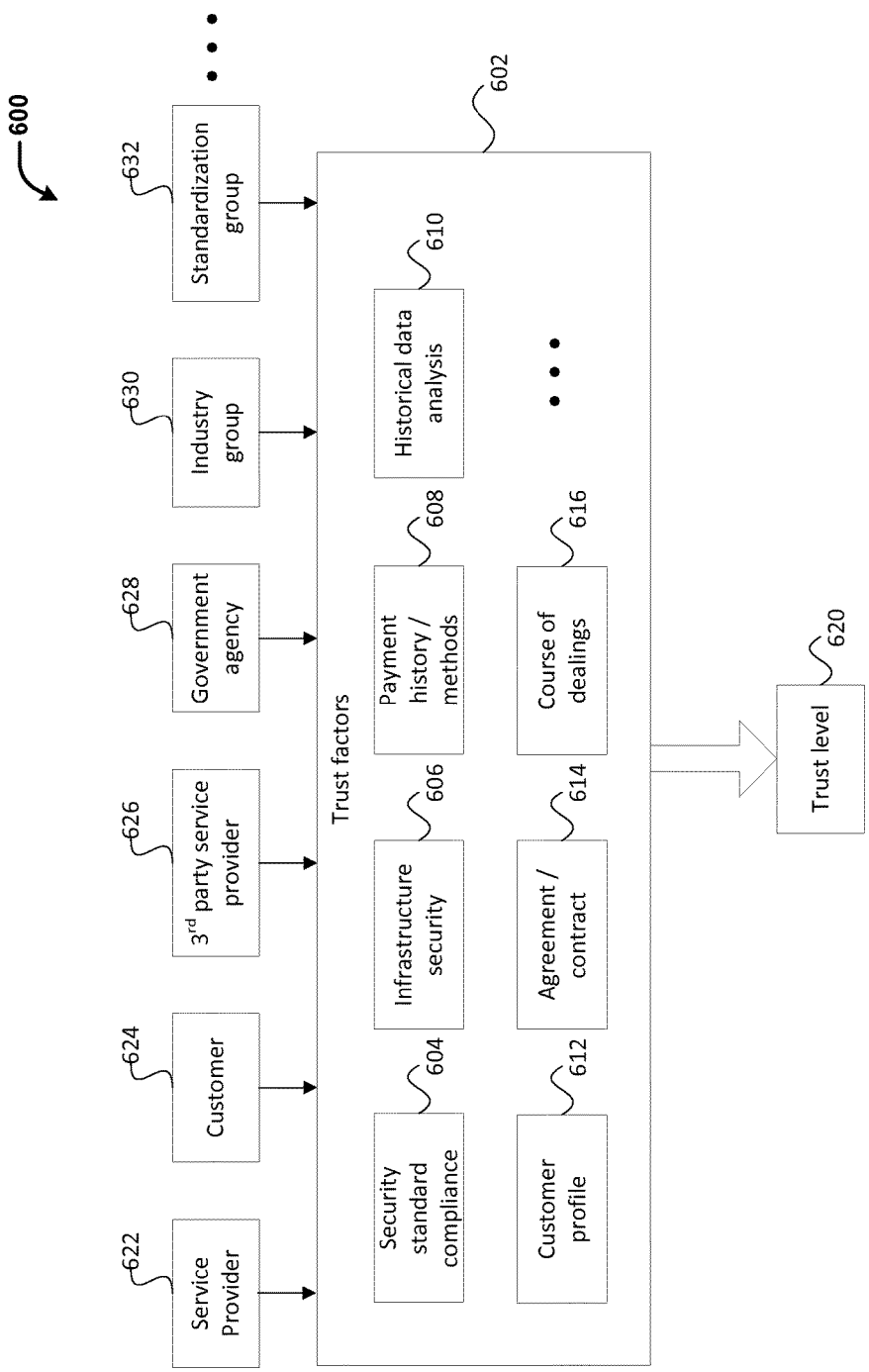
FIG. 6 illustrates an example implementation for determining a trust rating for a computing resource instance, in accordance with at least one embodiment.

FIG. 6 illustrates an example implementation 600 for determining a trust rating for a computing resource instance, in accordance with at least one embodiment. In various embodiments, a trust rating 620 for a computing resource instance may be determined by a computing resource service provider, a customer or a third-party entity. In an embodiment, the trust rating 620 may be determined based at least in part on one or more trust factors 602. In some embodiments, different sets of trust factors may be applied to evaluate trust ratings for different instances, for example, based on configuration information, identity of the customer, cost of computing resources, system performance characteristics and the like. In some embodiments, a trust rating 620 may be determined for one or more customers, one or more accounts and/or instances of a customer, a portion of an instance or an entity at any level of granularity.

In various embodiments, trust factors 602 may be based on information obtained from a variety of sources. Such information sources may include a service provider 622 that provides computing resource services described herein. For example, the service provider 622 may maintain records, logs, statistics and other information about its customers and customer activities. The information sources may also include a customer 624, who may provide information usable for evaluating a trust rating (such as audit reports, security compliance certificates, financial reports) via a user interface such as a graphical user interface, an API and the like. The information sources may also include third party service providers 626 such as security rating or auditing agencies, certification and compliance testing agencies such as ISA Security Compliance Institute (ISCI), data analytics service providers and the like, government agencies 628 such the National Institute of Standards and Technology (NIST), Federal Trade Commission (FTC), Department of Justice (DOJ), and the like, industry or professional groups 630 such as Trusted Computing Group (TCG), Payment Card Industry (PCI) Standards Council, America Institute of Certified Public Accountants (AICPA) and the like, standardization groups 632 such as International Organization for Standardization (ISO), International Electrotechnical Commission (IEC), International Society for Automation (ISA) and the like, and other sources such as social media.

In various embodiments, trust factors 602 used to evaluate a trust rating of a customer may include security standard compliance 604, level of security associated with a customer's computing infrastructure 606, payment history and methods 608, analysis of historical data 610, customer profile 612, agreement or contract 614, course of dealings 616 between a customer and a service provider and other factors. In some embodiments, the analysis of the above factors may overlap. The results of evaluation of the trust factors may be combined in any suitable fashion to derive an overall trust rating for the computing resource instance. For example, in an embodiment, the evaluation of each trust factor results in a numeric value which may be combined, for example, in a linear fashion, to derive an overall trust rating. The trust factors do not necessarily contribute equally to the overall trust rating.

In some embodiments, security standard compliance 604 may include compliance with one or more security standards which may include ISO standards such as ISO 27002, ISO/IEC 17799, Standard of Good Practice (SoGP) published by the Information Security Forum (ISF), Critical Infrastructure Protection (CIP) standards created by the North American Electric Reliability Corporation (NERC), security standards published by NIST such as NIST 800-12, RFC 2196, ISA-99 and the like, payment card industry standards such as PCI DSS (Payment Credit Industry Data Security Standard), PA-DSS (Payment Application Data Security Standard) and PIN Transaction Security (PTS), auditing standards such as Statement on Auditing Standards (SAS) No. 70 and any other standards. In addition, security standard compliance 604 may include compliance with one or more security laws or regulations such as Health Insurance Protability and Accountability Act (HIPPA), Gramm-Leach-Bliley Act (GLBA), Sarbanes-Oxley Act of 2002 (SOX) and the like. In various embodiments, compliance evaluation may include verification of compliance certificates or certifications that a customer may hold, evaluating results of audits that may be performed by the customer, the service provider or a third-party entity such as a certification agency or professional.

In some embodiments, different customers may be evaluated against different list of security standards and/or regulations, for example, based on the industry of the customer, the size of the customer and the like. For example, a customer who is in the payment industry may be evaluated for PCI DSS compliance, whereas a customer in the healthcare industry may be evaluated for compliance with HIPPA. In some embodiments, each standard or regulation in a compliance list may be associated with a weight which may indicate a relative importance of the standard or regulation among the standards and regulations within the list. Depending on a customer's compliance with standards or regulations in a compliance list, a trust factor score may be calculated, for example, based on a linear combination of the weight values associated with applicable standards or regulations.

Table 1 and Table 2 illustrate two example compliance lists A and B, respectively, according to at least one embodiment. For example, in an embodiment, a customer that complies with S1 and S5 of compliance list A may have a score of 5+0+2=7 for the trust factor; whereas a customer that complies with S1, S3 and S5 of compliance list A may have a score of 5+3+2=10 for the trust factor.

TABLE 1

Example compliance list A, in accordance with at least one embodiment.

Compliance List A

| Standard/Regulations | Weight |
| --- | --- |
| S1 | 5 |
| S3 | 3 |
| S5 | 2 |

TABLE 2

Example compliance list B, in accordance with at least one embodiment.

Compliance List B

| Standard/Regulations | Weight |
| --- | --- |
| S2 | 2.5 |
| S3 | 2.5 |
| R1 | 2.5 |
| R2 | 2.5 |

In some embodiments, trust factors may include infrastructure security 606 of a customer. Such infrastructure security may be inferred from configuration files or templates of computing resources instances, audit results and other similar information. For example, a virtual machine image may include a version of an operating system that is known to have certain security vulnerabilities. In this case, the trust factor value may be assigned a low value, for example, to indicate a low trust rating of the customer instance. In some embodiments, the analysis of the infrastructure security 606 of a customer may incorporate or be incorporated by the analysis of security standard compliance 604. For example, a customer that complies with one or more security standards may be considered to have a likelihood of higher infrastructure security.

In some embodiments, trust factors may include payment history and methods 608 of a customer. Such payment history and methods may indicate, to some degree, the reliability or trustworthiness of a customer. For example, a customer that has consistently paid its bills on time may be given a higher trust rating than a customer that has been delinquent in bill payment. For another example, the method of payment may indicate the financial stability and hence reliability of a customer. Thus, a customer that pays using invoices may be considered to have a higher trust rating than a customer that pays with a credit card. Other information related to payment may also be considered part of this factor.

In some embodiments, trust factors may include results of analysis 610 of historical data. Such data may include resource usage data attributable to a customer for CPU, memory, storage and/or network resources, logs or records of security breaches or attacks sustained or caused by a customer instance and other similar customer information. Various tools such as statistical analysis, data mining, pattern recognition, machine learning and the like may be used to determine, for example, abusive usage patterns, vulnerability to certain types of security attacks and other security risks of a customer. For example, a customer whose instances cause frequent security attacks such as distributed denial-of-service (DDoS) attacks and/or consistently abuse shared resources may be assigned a lower trust rating.

In some embodiments, customer profile 612 may be analyzed to determine the customer's trust rating. A customer's profile may include its size (e.g., number of employees, annual revenue), type or line of business, geographic region, financial status, statistics, reputation and other customer-related information. For example, a government agency or a Fortune-500 corporation may be determined to have a higher trust rating than a small company because the former is likely to more investment at stake and hence likely to have made substantial investment in ensuring the security of its infrastructure. Likewise, a customer with an established and profitable business may be assigned a higher trust rating than a customer that has not made a profit. In some embodiments, customers from a particular geographic region may be assigned a higher trust rating than customers from another geographic region.

In some embodiments, agreements or contracts 612 between a customer and a service provider may influence the trust rating assigned to a customer. For example, provisions from a service agreement or contract may specify the type of services provided along with any warranties by the service provider, pricing and payment options for services, security guidelines for the customer and the like. In some cases, a customer that has made substantial investment for services from a service provider (e.g., by owning and/or operating hundreds of computing resource instances hosted by the service provider) may have more incentive to ensure the security of the services than a customer that has made little investment (e.g., by owning only one or two computing resource instances). Likewise, a customer that has elected to provision dedicated implementation resources to host at least some of its instances, for example, by paying extra fees, may be determined to have a higher trust rating. In some embodiments, an agreement or contract between a customer and a service provider, such as a non-disclosure agreement, may increase the likelihood that a customer will take measures to ensure the security of its infrastructure.

In some embodiments, course of dealings 616 between a customer and a service provider may be used to evaluate the trust rating of a customer. The course of dealings may include past business transactions, established protocols, the length and/or substance of the relationship and the like between the customer and the service provider. For example, a customer that has a long (e.g., over ten years) and established relationship with the service provider may be determined to have a higher trust rating than a relatively new (e.g., less than 3 months) customer. For another example, a customer that has frequent and/or substantial business dealings with a service provider may be assigned a higher trust rating than a customer that engages in only sporadic and/or less substantial transactions with the service provider.

In various embodiments, a trust rating 620 may be determined based on some or all of the factors described above for a customer, group of customers, one or more computing resource instances of a customer, one or more accounts of a customer, or any other customer entities. Different customer entities may be evaluated against the same or different sets of trust factors. As discussed above, the evaluation of each factor may produce a trust factor value that is then combined (e.g., in a linear combination) with trust factor values of the other trust factors. In some embodiments, the trust factors may be weighted to indicate the priority or importance of the factor in the overall trust evaluation. In various embodiments, trust rating and trust factor value may be represented by a numeric value, a descriptive value (e.g., "high," "medium," or "low") and the like or any combination thereof. For example, in an embodiment, the trust rating of a customer may be calculated as $$\sum_{i=1}^{n} f_i w_i$$

where $f_i$ is the trust factor value of the $i^{th}$ factor, and $w_i$ is the weight associated with the $i^{th}$ factor, i being a positive integer. In some embodiments, the trust rating thus determined may be used, at least in part, to select a suitable implementation resource to host the computing resource(s) associated with the customer entity or entities described above.

In some embodiments, the trust rating of a customer or customer instance may be based at least in part on the customer's relationship to other customers. Such a relationship may be established, for example, by the sharing of common characteristic(s). For example, customers that launch the same virtual machine image(s) may be determined to exhibit similar trustworthiness and hence may have similar trust ratings. As another example, customers or requests by customers that come from a particular geographic region may be determined to have similar trust ratings based, for example, on analysis of historical information.

In some embodiments, the selection and prioritization of factors contributing to the trust rating of a computing resource instance and/or implementation resource may be determined based at least in part on analysis of historical data and/or projection of future data, such as using statistical analysis and/or pattern recognition techniques. For example, factors used to evaluate trust ratings may be added, removed, modified (e.g., changing the weight of a factor relative to other factors) based on emerging trends in customer usage data, for example.

Figure 7:
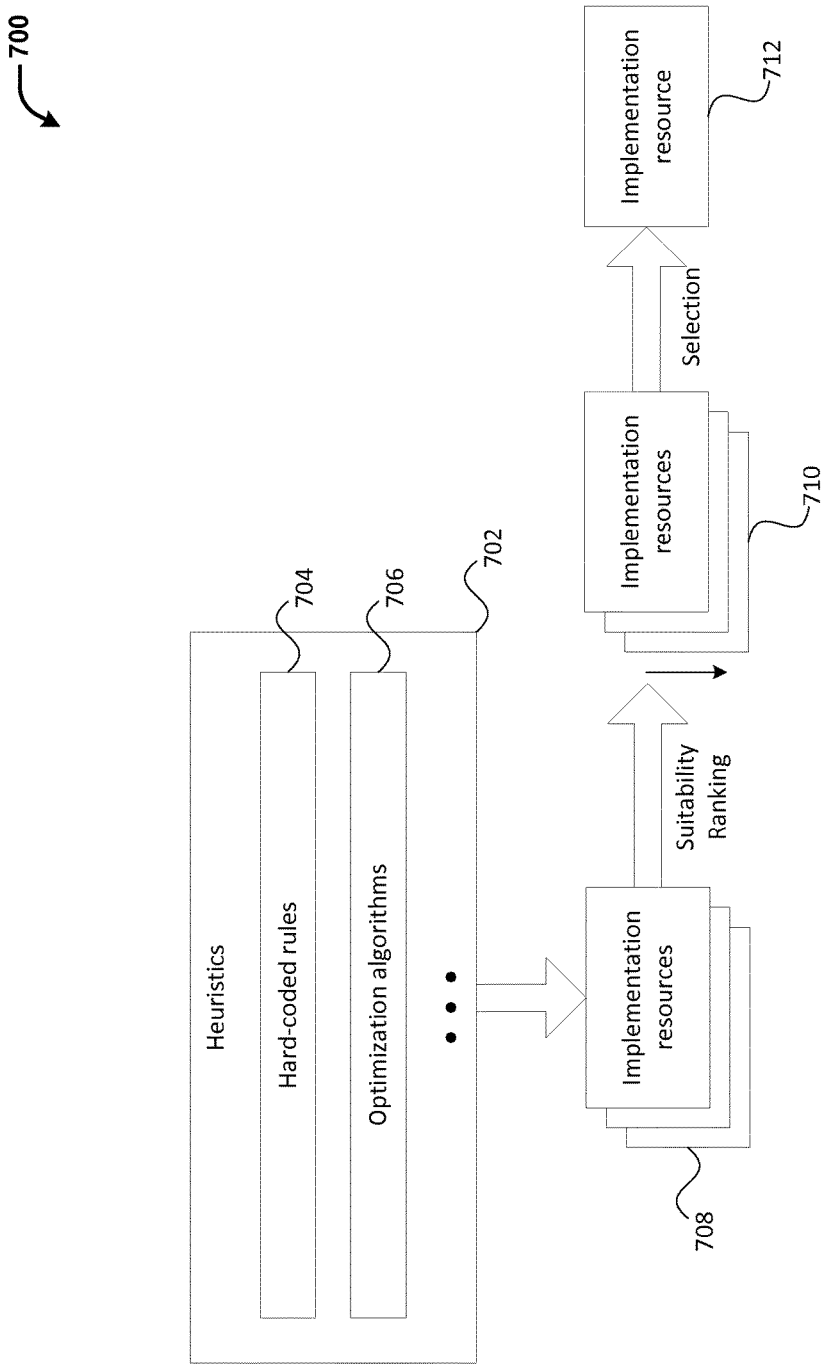
FIG. 7 illustrates an example implementation for selecting an implementation resource to implement a computing resource instance, in accordance with at least one embodiment.

FIG. 7 illustrates an example implementation 700 for selecting an implementation resource to implement a computing resource instance, in accordance with at least one embodiment. In some embodiments, a set of one or more heuristics 702 may be used to evaluate the suitability of one or more implementation resources 708 to host a particular instance of computing resource. In some embodiments, the heuristics 702 may be based at least in part on the trust factors discussed above and/or the trust rating associated with the customer or customer instance. In some embodiments, the set of heuristics 702 may include hard-coded rules 704 with predefined criteria, optimization algorithms 706 and other types of factors, rule or algorithms. Examples of hard-coded rules 704 may include "a virtual computer system instance with an operating system lower than version 1.2.3.20 cannot be co-hosted with other instances with trust ratings above 8" or "instances of customers that have been customers for more than five years must be implemented separately from instances of customers that have been customers for less than one year." In some embodiments, such hard-coded rules may be used to exclude from consideration or render unsuitable some of the implementation resources 708 that are otherwise suitable to implement a given computing resource instance.

In some embodiments, the set of heuristics 702 may include one or more optimization algorithms or rules 706. An example of an optimization algorithm may include determining a trust rating of an implementation resource base at least in part on the trust ratings of computing resource instances currently implemented by the implementation resource and determining the suitability of the implementation resource based at least in part on the proximity of the trust rating to the trust rating of the computing resource instance to be provisioned.

In some embodiments, each implementation resource 708 may be assigned a suitability ranking or suitability level based at least in part on the heuristics 702 described above. In an embodiment, the suitability ranking may include a number, where a higher value represents better suitability to implement the computing resource instance. For example, an implementation resource that is excluded by a hard-coded rule 704 may have a suitability ranking of 0. For another example, an implementation resource that has a trust rating that is very close to that of the computing resource instance may have a suitability ranking of 0.9. Similar to the evaluation of trust factors, the same or different set of heuristics may be used for different computing resource instance and/or implementation resource and each heuristic may carry the same or a different priority or significance towards the suitability ranking In various embodiments, the heuristics may be predefined, dynamically obtained or in a combination thereof. For example, in an embodiment, default rules may be provided to start with and subsequently, rules or algorithms may be added, removed or modified, manually or automatically. Additionally, the relative importance of the heuristics may also change. In some embodiments, the changes to the heuristics may be based on statistical analysis of customer data and/or machine learning algorithms, for example.

In some embodiments, implementation resources may be sorted or ranked 710, for example, in a descending order, according to their suitability rankings. Thereafter, an implementation resource 712 may be selected based on the ranking. For example, the highest ranking implementation source may be selected or an implementation resource may be selected at random from the N top-ranking implementation resources, where N>1. In other embodiments, more than one implementation resources (e.g., two servers) may be selected to implement a given computing resource instance.

In some embodiments, a whitelist or blacklist may be applied before, during, or after the implementation resource selection process described above to select or exclude implementation resources. For example, a whitelist may include a list of customers known to have a relatively secure infrastructure whereas a blacklist may include a list of customers that have been the target of security attacks. In some embodiments, such whitelists or blacklists may evolve over time as the trust ratings of customers change.

In some embodiments, implementation resources may be selected or excluded based on factors other than trust, such as location, availability or isolation requirement, capacity, load balancing, computing resource instance type and the like. In various embodiments, such non-trust based selection or exclusion may be performed before, as part of, or after the trust-based implementation resource selection process.

Figure 8:
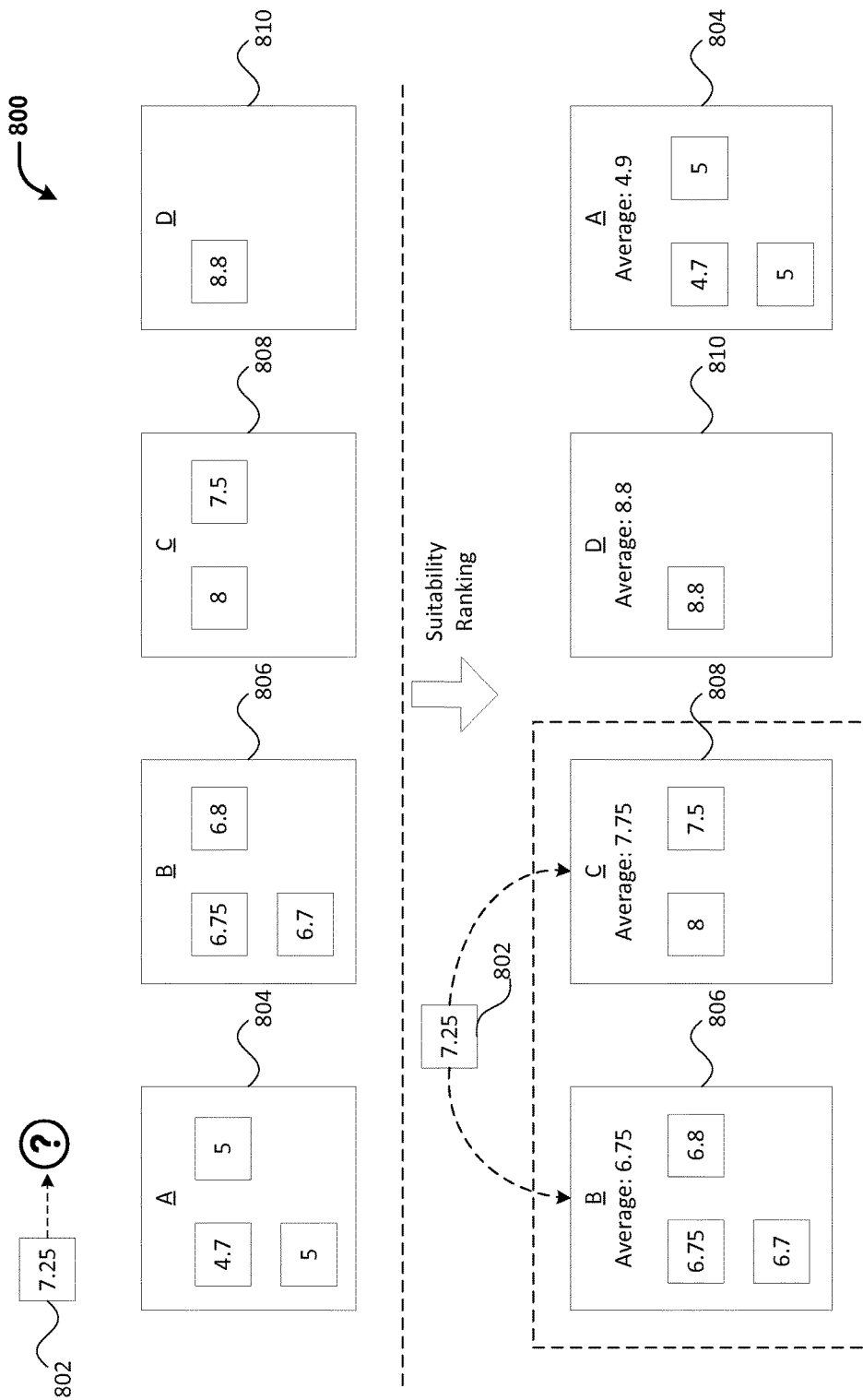
FIG. 8 illustrates an example implementation for selecting an implementation resource based on trust ratings of currently implemented computing resource instances, in accordance with at least one embodiment.

FIG. 8 illustrates an example implementation for selecting an implementation resource based on trust ratings of currently implemented computing resource instances, in accordance with at least one embodiment. In particular, under the illustrated method, computing resource instances with similar trust ratings are more likely to be co-located on the same implementation resources. In this example, a computing resource instance 802 is to be provisioned on one of the implementation resources A 804, B 806, C 808 and D 810, each of which is capable of implementing the computing resource instance 802, which has a trust rating of 7.25 that is determined using techniques such as discussed in connection with FIG. 6. Further, the implementation resources A 804, B 806, C 808 and D 810 may each implement one or more computing resource instances with trust ratings as shown in FIG. 8. For example, implementation resource A 804 currently implements three instances with trust ratings 4.7, 5 and 5, respectively.

To determine the suitability of the implementation resources to implement computing resource instance 802, a trust rating of each of the implementation resource may be calculated based at least in part on the trust ratings of existing instances on the implementation resource. In the illustrated example, the trust rating of an implementation resource is simply the average of the trust ratings of currently implemented computing resource instances. For example, the trust ratings for implementation resources A 804, B 806, C 808 and D 810 are 4.9, 6.75, 7.75 and 8.8, respectively. In other embodiments, the trust rating of an implementation resource may be calculated differently than described above. For example, the trust rating may be a median, minimum or maximum or any suitable calculation based on the trust ratings of currently or previously implemented computing resource. The trust ratings of some of the instances may be weighted differently toward the calculation of the trust rating of the implementation resource. For example, the trust rating of a large computing resource instance may be given a more significant weight. In yet other embodiments, the trust rating may be based on factors other than trust ratings of computing resource instances. For example, an implementation resource with security safeguards (e.g., firewall) may be associated with a higher trust rating.

In some embodiments, for each implementation resource, the difference between the trust rating for the implementation resource and the trust rating of instance 802 may be calculated. The closer the difference the more suitable an implementation resource may be determined to implement the instance. In an illustrative embodiment, implementation resources may be ranked based at least in part on the proximity between the trust rating of the implementation resources and the trust rating of the instance to be provisioned. For example, in FIG. 8, implementation resources A 804, B 806, C 808 and D 810 are ranked in ascending order of the differences. In this case, implementation resources B 806 and C 808 may rank the highest with a difference of 0.5, followed by implementation resource D 810 with a difference of 1.55 and implementation resource A 804 with a difference of 2.35.

In some embodiments, the highest ranking implementation resource may be select to implement the instance 802. In this case, either implementation resource B 806 or C 808 may be selected. In some embodiments, some tie-breaking rules may be used to break a tie. For example, such a rule may specify that an implementation resource with a lower trust rating always wins in such situations, giving a preference to implementation resource B 806 in this case. In some embodiments, an implementation resource may be selected from the N top ranking implementation resources where N>1. For example, if N=3, an implementation resource may be selected from implementation resources B 80, C 808 and D 810. For another example, an implementation resource may be selected from all implementation resources with a trust rating above, below or with certain threshold value(s). Such threshold values may be based on the trust rating of the instance to be provisioned. Or, an implementation resource may be selected from all implementation resources with a trust rating difference (i.e., the difference between the trust rating of the implementation resource and the trust rating of the computing resource instance to be provisioned) below certain predefined threshold.

Figure 9:
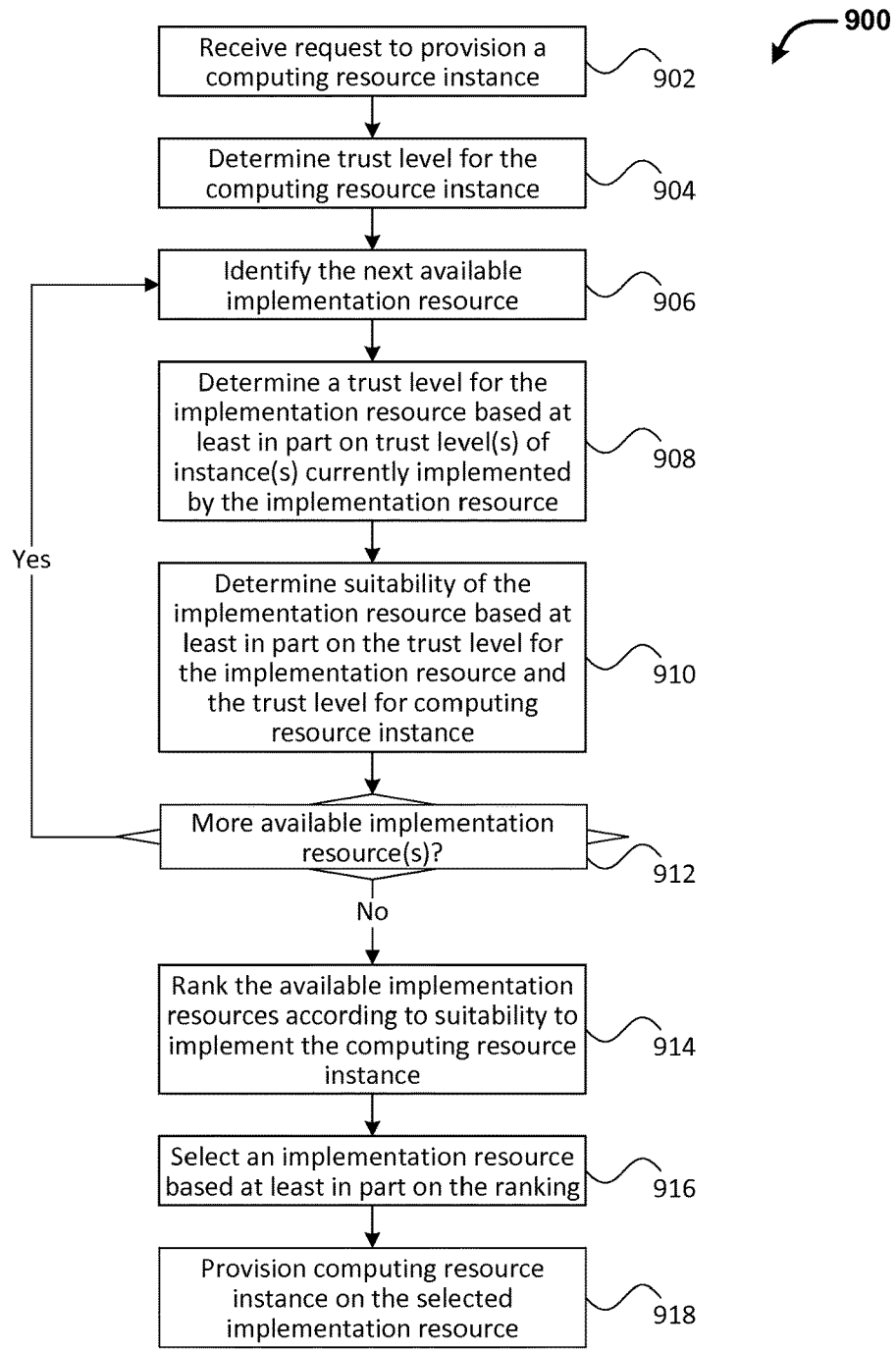
FIG. 9 illustrates an example process for provisioning a computing resource instance, in accordance with at least one embodiment.

FIG. 9 illustrates an example process 900 for provisioning a computing resource instance, in accordance with at least one embodiment. Some or all of the process 900 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In an embodiment, process 900 may be implemented by a management system as described in connection with FIGS. 2-4.

In some embodiments, the process 900 may include receiving a request to provision a computing resource instance. For example, a customer of a distributed program execution service, such as described in connection with FIG. 4, may send such request the provision of a virtual computer system instance for remote programmatic management. In another embodiment, the provisioning request may be sent by a component internal to a service provider.

The process 900 may include determining 904 a trust rating for the computing resource instance based at least in part on one or more trust factors, such as described in connection with FIG. 6. For example, the trust rating may be derived from information obtained from a customer, an entity implementing process 900, or a third party entity. Further, the trust rating may be determined by a customer, a service provider or any other entities. In some embodiments, a trust rating for a computing resource instance may be determined once in a predetermined period of time (e.g., on a daily basis) and stored, for example, in a cache. In such embodiments, the stored trust rating may be used for subsequent provisioning request for the same computing resource instance, for other computing resource instances associated with the same customer, or the like, without the need to derive a trust rating from scratch. In some embodiments, a trust rating for a customer or customer instance may be computed asynchronously, for example, by a background process. In some other embodiments, the trust rating may be computed on-the-fly.

In some embodiments, the process 900 may include identifying 906 the next available implementation resource for assessment. In some embodiments, identifying 906 the next available implementation resource(s) may include selection and/or exclusion of implementation resources based at least in part on one or more criteria that may or may not be specified by a customer. In some embodiments, customer-specified criteria may be obtained from a user request, a user interface, configurable information such as a configuration file, a service agreement and the like. For example, a provisioning request may specify the instance type, for example, that defines the amount of memory usage, CPU usage, storage capacity, pricing and the like associated with the instance. In some embodiments, the provisioning of a computing resource instance may also include determining geographic location, availability and other characteristics associated with of the implementation resource (e.g., server, data center and the like) that may or may not be specified by a customer.

Once an available implementation resource is identified 906, the implementation resource may be evaluated for its suitability to host the computing resource instance. In some embodiments, the process 900 may include determining 908 a trust rating for the current implementation resource based at least in part on the trust rating(s) of some of the computing resource instance(s) that are currently implemented by the implementation resource. For example, in an embodiment, the trust rating of an implementation resource may be based on an average of trust ratings of instances currently implemented by the implementation resource. In another embodiment, the trust rating may be based on the minimum or the maximum of the trust ratings of the currently implemented instances. In some embodiments, not all instances currently implemented by the implementation resource may be selected for the calculation of the trust rating for the implementation resource.

Based at least in part on trust rating for the computing resource instance to be provisioned and the trust rating for the implementation resource, the system implementing process 900 may determine 910 the suitability of the current implementation resource to implement the computing resource. For example, in an embodiment, the smaller the difference between the trust rating for the computing resource and the trust rating for the implementation resource, the more suitable the implementation resource may be determined to be. In some embodiment, a suitability level may be assigned to the implementation resource based on the determination. In other embodiments, suitability may be represented by a collection of metrics. In various embodiments, the suitability of the implementation resource may be further based on other factors or heuristics such as described in connection with FIG. 7.

In some embodiments, the process 900 may include determining 912 whether one or more implementation resources are available. If so, the process 900 may include evaluating the suitability for those implementation resources in a similar fashion as described above. Otherwise, the process 900 may include ranking 914 the available implementation resources according to their corresponding suitability levels as determined above. For example, the implementation resources may be ranked according to a descending order of the suitability levels, where a higher suitability level indicates better suitability. In some embodiments where the suitability is represented by a collection of metrics, the ranking may be determined by a predefined order among the collection of metrics.

In some embodiments, the process 900 may include selecting 916 an implementation resource based at least in part on the ranking of the implementation resources. For example, in an embodiment, an implementation resource determined to be the most suitable may be selected. In another embodiment, an implementation resource may be selected at random from the top N implementation resources.

Finally, the process 900 may include provisioning 918 the computer resource instance by causing the computing resource instance to be implemented by the selected implementation resource. For example, a virtual machine instance may be launched on a selected computer server.

Figure 10:
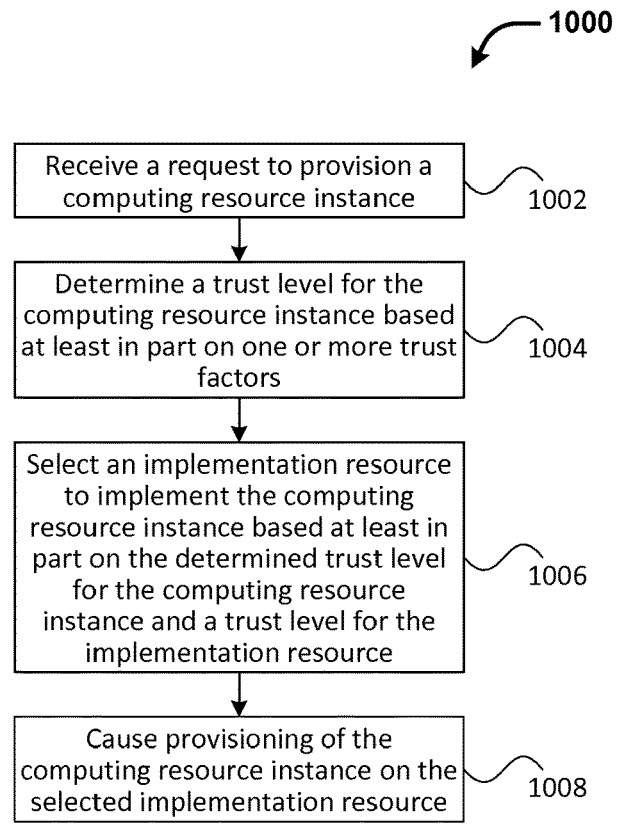
FIG. 10 illustrates an example process for provisioning a computing resource instance, in accordance with at least one embodiment.

FIG. 10 illustrates another example process 1000 for provisioning a computing resource instance, in accordance with at least one embodiment. In an embodiment, process 1100 may be implemented by a management system as described in connection with FIGS. 2-4.

In some embodiments, the process 1000 may include receiving 1002 a request to implement a computing resource instance. For example, such a request may include a request to provision an implementation resource for implementing the computing resource.

In some embodiments, the process 1000 may include determining 1004 a trust rating for the computing resource instance based at least in part on one or more trust factors. The determination 1004 may be performed similar to the determination 904 as discussed in connection with FIG. 9.

In some embodiments, the process 1000 may include selecting 1006 an implementation resource to implement the computing resource instance based at least in part on the determined trust rating for the computing resource instance and a trust rating for the implementation resource. The determination of the trust rating for the implementation resource may be based on trust ratings of computing resource instances currently implemented by the implementation resource, such as described in connection with block 910 of FIG. 9. In other embodiments, the trust rating for the implementation resource may also be determined based on software or hardware security, network location, geographic location, isolation/availability zone and the other characteristics of the implementation resource.

In some embodiments, an implementation resource may be selected 1006 based on the proximity of the trust rating for the implementation resource to the trust rating of the computing resource instance. For example, the closer the trust ratings are, the more likely an implementation resource may be selected. In general, the implementation resource may be selected based on the trust rating of the computing resource instance alone, trust rating of the implementation resource alone, other factors or any combination thereof. For example, an implementation resource that is relatively isolated from the rest of the network may be selected to implement a computing resource instance with a very low trust rating to reduce the risk of interference with other computing resource instances. In some embodiments, the process 1000 may include causing 1008 the implementation of the computing resource instance by the selected implementation resource.

Figure 11:
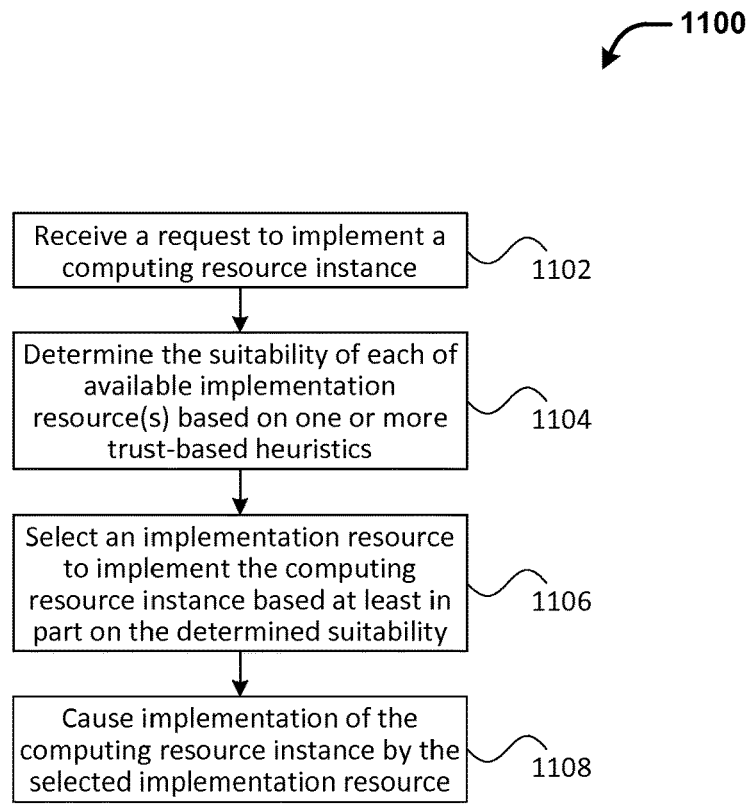
FIG. 11 illustrates another example process for provisioning a computing resource instance, in accordance with at least one embodiment.

FIG. 11 illustrates another example process 1100 for provisioning a computing resource instance, in accordance with at least one embodiment. In an embodiment, process 1100 may be implemented by the management system as described in connection with FIGS. 2-4.

In some embodiments, the process 1100 may include receiving 1102 a request to implement a computing resource instance. For example, such a request may be sent by a customer of a distributed program execution service such as described in connection with FIG. 4.

In some embodiments, the process 1100 may include determining 1104, for each of one or more available implementation resources, the suitability of the implementation resource to implement the computing resource instance based at least in part on one or more trust-based heuristics. In some embodiments, the one or more available implementation resources may be selected based on customer-specified criteria such as instance type, region, availability zone and the like. In various embodiments, trust-based heuristics may include hard-coded rules and optimization algorithms such as those discussed in connection with FIG. 7. For example, a trust-based heuristic may preclude the co-location instances with certain trust-related characteristics. Such a trust-based heuristic may specify, for example, that "a virtual machine instance with an operating system version lower than 1.2.3.20 cannot be co-hosted with a virtual machine instance with an operating system version higher than 1.2.3.30." The trust-based heuristics may also include determining a trust-level for each of the available implementation resources based on instances that are currently implemented by the implementation resource, such as described in connection with FIGS. 8 and 9. In some embodiments, the trust-based heuristics may be based at least in part on a trust rating for the computing resource instance such as described in connection with FIGS. 6 and 8.

In some embodiments, the process 1100 may include selecting 1106 an implementation resource to implement the computing resource instance based at least in part on the determined suitability for the implementation resource. For example, in an embodiment, any implementation resource with a suitability level above a predefined threshold value may be selected. In another embodiment, implementation resources may be ranked according to their suitability such as described in connection with FIGS. 8 and 9.

In some embodiments, the process 1100 may include causing 1108 the implementation of the computing resource instance by the selected implementation resource.

Variations of the above are also considered as being within the scope of the present disclosure. For example, methods for allocating implementation resources as described above may be used to allocate other physical and logical components, such as disks, volumes, racks of devices, data centers, regions, availability zones and the like, in any other level of abstraction in a network topology.

In some embodiments, changes in trust ratings associated with computing resource instances or implementation resources or other changes may cause adjustment to the provisioning of computing resource instances. For example, a computing resource instance may be migrated to a different implementation resource based on a change in the trust rating for the computing resource instance or the trust rating associated with the current implementation resource. For example, an increase in the trust rating of a computing resource instance may cause the instance to be moved to a new implementation resource with a higher trust rating than the current implementation resource. In some embodiments, such migration may be performed live while the instance is running, upon reboot of the computing resource instance, or at any other suitable time in any suitable manner.

Figure 12:
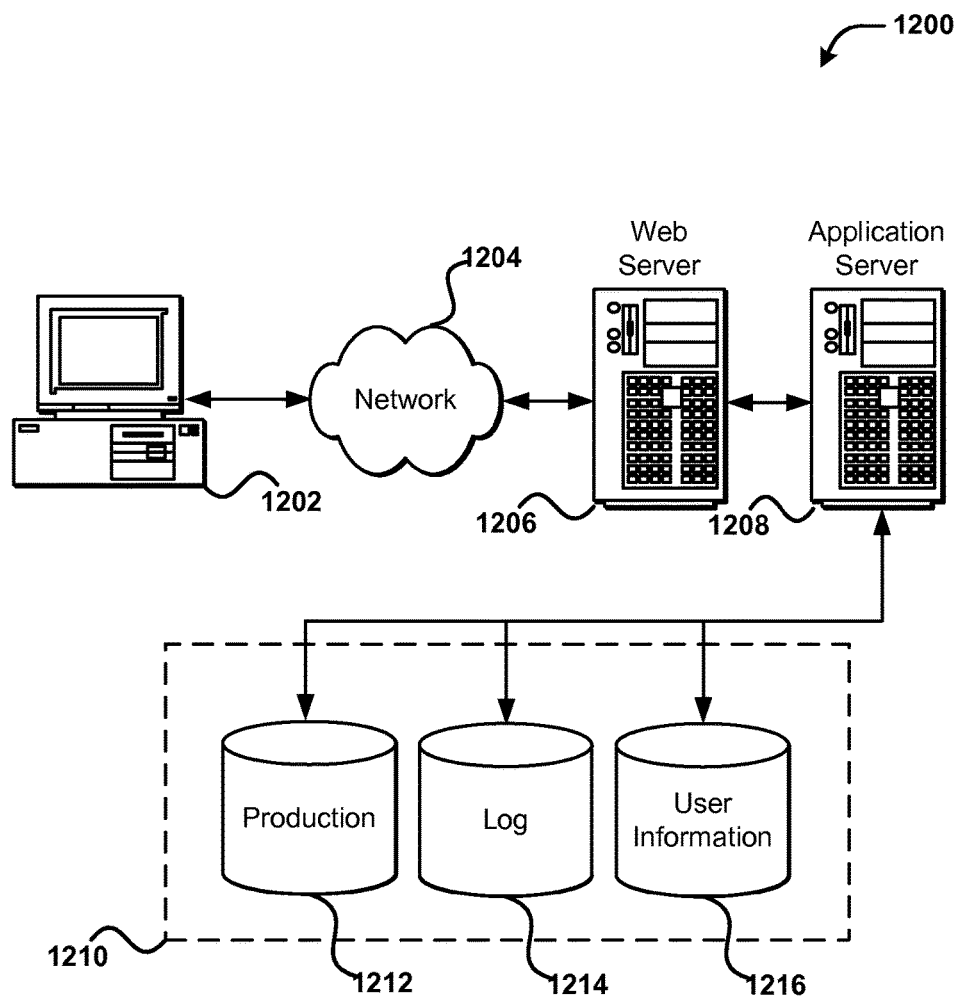
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for provisioning virtual computer system instances, comprising:
   under the control of one or more computer systems configured with executable instructions,
      receiving a request to provision a virtual computer system instance for remote programmatic management by a customer of a distributed program execution service;
      determining a trust rating for the virtual computer system instance based at least in part on one or more trust factors related to the customer;
      selecting a computer system, from a plurality of computer systems, to implement the virtual computer system instance based at least in part on the determined trust rating for the virtual computer system instance and a trust rating for the computer system; and
      causing provisioning of the virtual computer system on the selected computer system,
   wherein the trust rating for the computer system is based at least in part on one or more trust ratings associated with one or more virtual computer system instances that are provisioned on the computer system.

2. The computer-implemented method of claim 1, wherein the one or more trust factors are based at least in part on a security indicator associated with the customer's computing infrastructure.

3. The computer-implemented method of claim 1, wherein determining the trust rating for the virtual computer system instance includes analyzing historical data related to one or more computing resources used by the customer.

4. The computer-implemented method of claim 1, wherein selecting a computer system to implement the virtual computer system instance further comprises:
   determining, for each computer system of the plurality of computer systems, a suitability level that indicates how suitable the computer system is to implement the virtual computer system based at least in part on the trust rating of the virtual computer system instance and a trust rating for the computer system; and
   ranking at least a subset of the plurality of computer systems at least according to the suitability levels associated with the plurality of computer systems.

5. The computer-implemented method of claim 1, wherein selecting a computer system to implement the virtual computer system instance is based at least in part on one or more heuristics determined to be indicative of trust.

6. A computer-implemented method for providing computing resource services, comprising:
   under the control of one or more computer systems configured with executable instructions,
      selecting, based at least in part on a trust rating associated with a first unprovisioned computing resource instance, an implementation resource to implement the first computing resource instance;
      causing the first computing resource instance to be provisioned using the selected implementation resource; and
      causing a second computing resource instance to be implemented by the same implementation resource based at least in part on a similarity of trust ratings respectively associated with the first and second computing resource instances.

7. The computer-implemented method of claim 6, wherein selecting the implementation resource to implement the first computing resource instance is based at least in part on a trust rating associated with the implementation resource.

8. The computer-implemented method of claim 6, wherein:
   selecting the implementation resource is responsive to a received request to provision the first computing resource instance, the received request being associated with a customer of a computing resource provider that selects the implementation resource; and
   the trust rating associated with the first unprovisioned computing resource instance is determined based at least in part on a trust rating associated with a customer.

9. The computer-implemented method of claim 6, wherein determining a trust rating associated with the first computing resource instance includes utilizing at least one of pattern recognition or statistical analysis in connection with data related to one or more computing resources provisioned by one or more customers.

10. The computer-implemented method of claim 6, wherein selecting the implementation resource includes:
    identifying a plurality of implementation resources based at least in part on a request to provision the first computing resource instance; and
    selecting the implementation resource from the plurality of implementation resources based at least in part on the trust rating associated with the first computing resource instance.

11. The computer-implemented method of claim 10, wherein selecting the implementation resources from the plurality of implementation resources includes determining a suitability level for each of the plurality of implementation resources.

12. A computer system for providing computing resource services, comprising:
    one or more processors; and
    memory, including instructions executable by the one or more processors to cause the computer system to at least:
       determine, for each of a plurality of computing resource instances, a trust rating; and
       allocate one or more implementation resources to implement the plurality of computing resource instances based at least in part on the trust ratings of the computing resource instances,
    wherein at least two of the plurality of computing resource instances are implemented by the same implementation resources based at least in part on a similarity of the trust ratings respectively associated with the at least two of the plurality of computing resource instances.

13. The computer system of claim 12, wherein at least two of the plurality of computing resource instances are associated with different customers.

14. The computer system of claim 12, wherein determining the trust rating for each of the plurality of computing resource instances includes obtaining information provided by a customer associated with the computing resource instance.

15. The computer system of claim 12, wherein allocating one or more implementation resources to implement the plurality of computing resource instances includes determining a trust rating for at least one of the one or more implementation resources.

16. The computer system of claim 15, wherein the trust rating for the at least one implementation resource is based at least in part on one or more trust ratings of one or more implementation resources that are currently implemented by the implementation resource.

17. One or more non-transitory computer-readable storage media having stored thereon executable instructions that, when executed by one or more processors of a computer system, cause the computer system to at least:
select an implementation resource to implement a computing resource instance based at least in part on a trust rating for the implementation resource; and
cause the computing resource instance to be implemented by the selected implementation resource,
wherein the trust rating for the implementation resource is based at least in part on one or more trust ratings associated with one or more computing resource instances that are being implemented by the selected implementation resource.

18. The one or more non-transitory computer-readable storage media of claim 17, wherein the executable instructions further cause the computer system to determine a trust rating for the computing resource instance based on a set of trust factors and wherein selecting the implementation resource to implement the computer resource instance is further based on the trust rating for the computing resource instance.

19. The one or more non-transitory computer-readable storage media of claim 18, wherein the set of trust factors includes at least one of vulnerability of the computing resource instance to a security threat or compliance with one or more security standards.

20. The one or more non-transitory computer-readable storage media of claim 17, wherein selecting the implementation resource is based at least in part on one or more customer-specified criteria.

21. The one or more non-transitory computer-readable storage media of claim 17, wherein the executable instructions further cause the computer system to cause a different implementation resource to implement the computing resource instance based at least in part on a change in the trust rating for the implementation resource.

22. The one or more non-transitory computer-readable storage media of claim 18, wherein the executable instructions further cause the computer system to cause a different implementation resource to implement the computing resource instance based at least in part on a change in the trust rating for the computing resource instance.

23. The one or more non-transitory computer-readable storage media of claim 18, wherein the set of trust factors includes at least one of security standard compliance, infrastructure security, payment-related information, customer profile information, course of dealings information, analysis of historical data, or contractual relationship information.

24. The computer-implemented method of claim 1, wherein the selecting of the computer system is for an initial implementation of the virtual computer system instance.

25. The computer system of claim 12, wherein the allocation of the one or more implementation resources if for an initial implementation of the plurality of computing resource instances.

26. The one or more non-transitory computer-readable storage media of claim 17, wherein the selecting of the implementation resource is for an initial implementation of the computing resource instance.

* * * * *